US008744535B2

(12) United States Patent  (10) Patent No.: US 8,744,535 B2
Chen  (45) Date of Patent: Jun. 3, 2014

(54) NAVIGATION TOOL HOLDER (75) Inventor: Chao Chen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 238 days.

(21) Appl. No.: 12/915,655

(22) Filed: Oct. 29, 2010

(65) Prior Publication Data

US 2012/0106092 A1  May 3, 2012

(51) Int. Cl.
H04M 1/02 (2006.01)
(52) U.S. Cl.
USPC .................... 455/575.1; 455/556.1
(58) Field of Classification Search
CPC ........................................................ H04M 1/02
See application file for complete search history.

(56) References Cited

U.S. PATENT DOCUMENTS

| | | | |
|---|---|---|---|
| 5,668,574 A * | 9/1997 | Jarlance-Huang | 345/158 |
| 5,703,947 A | 12/1997 | Hino et al. | |
| 6,097,964 A * | 8/2000 | Nuovo et al. | 455/566 |
| 2003/0148740 A1* | 8/2003 | Yau et al. | 455/90 |
| 2004/0192422 A1* | 9/2004 | Watanabe et al. | 455/575.3 |
| 2004/0253998 A1* | 12/2004 | Dunleavy et al. | 455/575.1 |
| 2006/0046796 A1* | 3/2006 | Park et al. | 455/575.4 |
| 2007/0032260 A1* | 2/2007 | Kim | 455/550.1 |
| 2007/0259698 A1* | 11/2007 | Chen et al. | 455/566 |
| 2008/0076487 A1* | 3/2008 | van der Meulen | 455/575.1 |
| 2008/0182631 A1* | 7/2008 | Otani et al. | 455/575.1 |
| 2010/0134964 A1* | 6/2010 | Smith et al. | 361/679.2 |
| 2011/0311040 A1* | 12/2011 | Chen | 379/420.02 |

FOREIGN PATENT DOCUMENTS

| | | |
|---|---|---|
| EP | 1575073 A1 | 9/2005 |
| EP | 1643732 A2 | 4/2006 |
| EP | 1850211 A2 | 10/2007 |
| WO | 9111683 A2 | 8/1991 |

OTHER PUBLICATIONS

Extended European Search Report mailed May 10, 2011, in corresponding application No. 10189457.4.
Haier H-U8W—Chinese WM Communicator middle class, Technology News, Dec. 25, 2009, http://phonestechnology.blogspot.com/2009/12/haier-h-u8w-chinese-wm-communicator.html.
Notice of Allowance and fee(s) due mailed Apr. 4, 2013, in corresponding European patent application No. 10189457.4.
Office Action mailed Nov. 29, 2013, in corresponding Canadian patent application No. 2,755,092.

* cited by examiner

*Primary Examiner* — Marcos Batista
*Assistant Examiner* — Frank Donado
(74) *Attorney, Agent, or Firm* — Novak Druce Connolly Bove + Quigg LLP (57) ABSTRACT

A navigation tool holder for a mobile device can include a top holder, a bottom holder, and a cover layered on top of the top holder. The top holder defines an opening for receiving a navigation tool. The bottom holder is configured to matingly engage the top holder. A navigation tool housed between the top holder and the bottom holder. The navigation tool includes a top portion protruding through the opening of the top holder and a flexible circuit communicatively coupling the navigation tool to a circuit board of the mobile device. The cover layer on the top holder can surround the top portion of the navigation tool so that the cover maintains an alignment of the navigation tool with a housing of the mobile device.

18 Claims, 9 Drawing Sheets

NAVIGATION TOOL HOLDER

FIELD

The present disclosure generally relates to mobile devices, and more specifically relates to navigation tools of mobile devices.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, mobile messaging devices, personal digital assistants, and handheld computers.

Whereas in the past, such mobile devices typically accommodated either voice transmission (cell phones) or text transmission (pagers and PDAs), today's consumer often demands a combination device capable of performing both types of transmissions, including sending and receiving e-mail. Furthermore, these higher-performance devices can also be capable of sending and receiving other types of data including that which allows viewing and use of Internet websites. These higher level functionalities necessarily require greater user interaction with the devices through included user interfaces (UIs) which may have originally been designed merely to accommodate making and receiving telephone calls and sending messages over a related Short Messaging Service (SMS). As the available functions of electronic devices continue to increase, the functionality of the UIs also needs to increase. Because electronic devices often have limited space for input devices and display screens, the size of the keyboard, the function buttons, the display and other components of the electronic device can be compromised to fit the switch panel on the electronic device. As might be expected, suppliers of such mobile electronic devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly through intervening components is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "optical navigation tool" refers to a navigation tool that receives inputs via optical sensors. Examples of optical navigation tools can include but are not limited to optical trackballs, jogballs, optical jogballs, optical trackpads, or any other optical navigation tool that receives inputs via optical sensors.

A mobile device can be assembled from a plurality of components, each made from different suppliers. In at least some implementations, components may not be designed to the exact specifications of another component, and thereby, may not perfectly align with the other components. As a result, components can become misaligned during assembly or use of the component by the end user. In at least one example, navigation tools can become misaligned during the assembly of the mobile device. For example, the navigation tool may not be concentric with an aperture formed in the mobile device housing. In another example, the navigation tool may become tilted within the aperture of the mobile device housing. The misalignment of the navigation module can affect the tactile feel of the navigation module. The present disclosure provides a navigation tool holder which can account for possible misalignments of the navigation module and can enhance the tactile feel of the navigation module.

A navigation tool holder includes a top holder, a bottom holder, and a spacer. The top holder is configured to matingly engage a bottom holder and defines an opening adapted to receive a navigation tool. A navigation tool is positioned between the top holder and the bottom holder such that a top portion of the navigation tool protrudes through the opening of the top holder. The spacer can be layered on top of the top holder and substantially surround the top portion of the navigation tool. When the navigation tool holder is assembled with a mobile device, the spacer is interposed between the top holder and a housing frame of the mobile device. In at least one implementation, the spacer can be co-molded to the edge of the top holder that defines the opening. The navigation tool is communicatively coupled to a circuit board and a display of the mobile device such that inputs received at the navigation tool correspondingly alter information displayed on the display.

Figure 1:
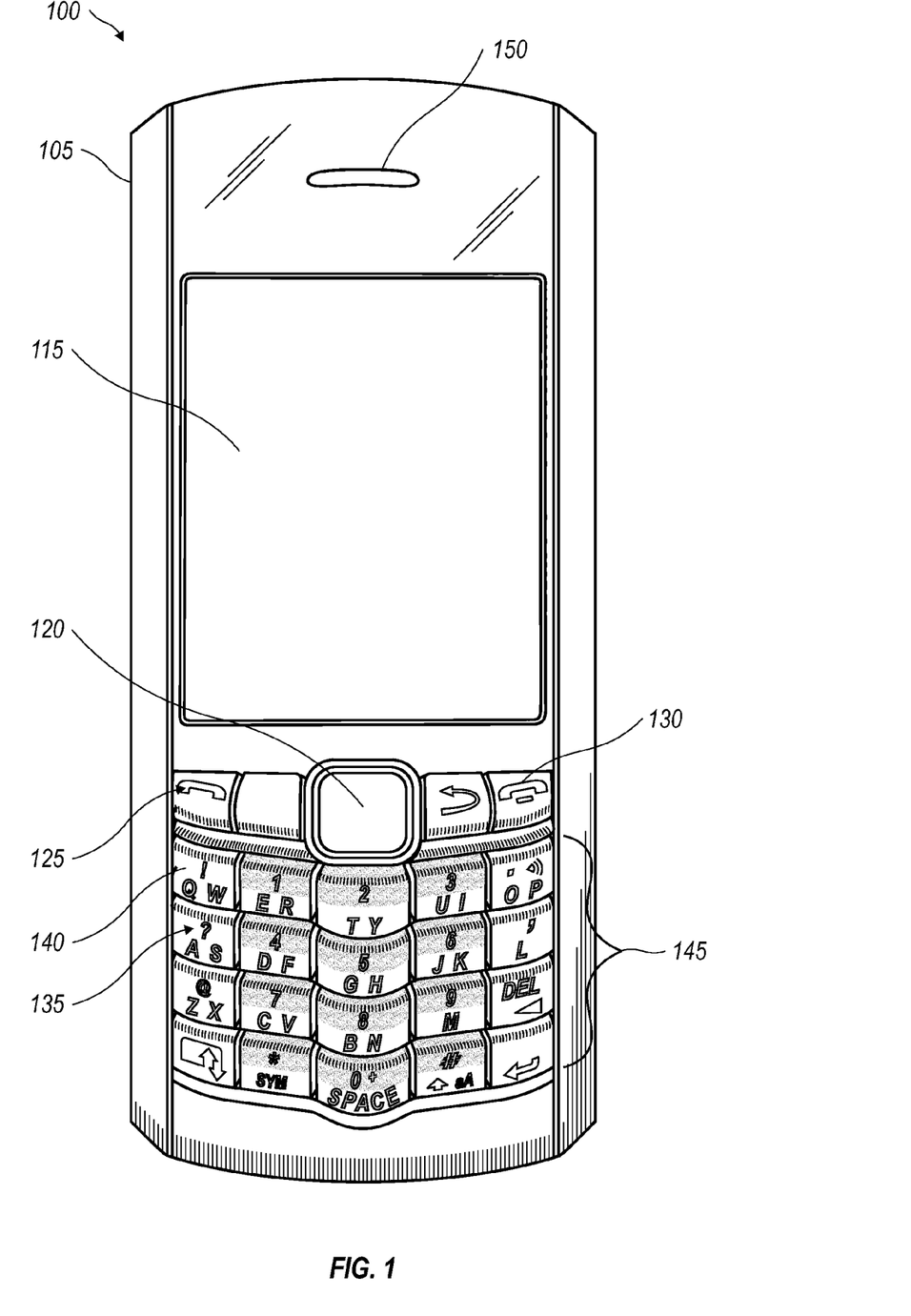
FIG. 1 illustrates an exemplary mobile device having a navigation tool housed in a navigation tool holder in accordance with an exemplary implementation of the present disclosure.

FIG. 1 illustrates an exemplary implementation of a mobile device having a navigation tool housed in a navigation tool holder in accordance with the principles of the present disclosure. In FIG. 1, the mobile device 100 includes a housing frame 105. The housing frame houses a display 115. The display 115 can be a liquid crystal display (LCD) screen, a light emitting diode (LED) screen, an organic light emitting diode (OLED) screen, an active-matrix organic light emitting diode (AMOLED) screen, a nanocrystal display, a nanotube display, a touch-sensitive display screen, or any display screen on which graphical or visual elements can be displayed. Above the display 115 is a speaker 150 for emitting sound from the mobile device 100. Adjacent to and below the display 115 can be a navigation tool module 120. The navigation tool module 120 includes a navigation tool housed in a navigation tool holder according to an exemplary implementation of the present disclosure. The navigation tool can be a jogball, an optical omnidirectional pad, an optical jogball, an optical trackball, an optical omnidirectional joystick, or any other optical navigation tool. In other implementations, the navigation tool can be a mechanical input device such as a joystick, a directional pad, a trackwheel, a trackball, or other mechanical input devices operable to alter information displayed on the display 115. The navigation tool module 120 can be positioned within a function key row 125. The function key row 125 comprises a plurality of function keys 130, such as a call key, an end call key, a favorite application key, a menu button, a back button, or any other key configured to execute functions or applications on the mobile device. Below the navigation tool module 120 and the function key row 125 can be a keyboard 135 having a plurality of keys 140. The keyboard 135 can be a full keyboard, a reduced keyboard, or a numerical keypad. In the illustrated implementation, each key 140 of the keyboard 135 bears at least one of an alphabetic, numeric, symbolic, or functional indicia. The indicia signify the data input to be input upon actuation of the key 140 bearing the indicia. In FIG. 1, the keyboard 135 is a reduced keyboard, where at least one key 140 is associated with more than one alphabetic indicia. The indicia on the keys 140 of the keyboard 135 are arranged in a QWERTY keyboard layout 145; however, one of ordinary skill in the art will appreciate that the keyboard layout 145 can be an AZERTY layout, a QWERTZ layout, a DVORAK layout, a pinyin Chinese keyboard layout, or any other keyboard layout that allows a user to input alphabetic, numeric, symbolic, and functional indicia. The keys 140 can be press-actuable keys, touch-sensitive keys, capacitive keys, or any other similar key that allows for the input of data to a processor of the mobile device upon user-engagement with the key 140.

Figure 2:
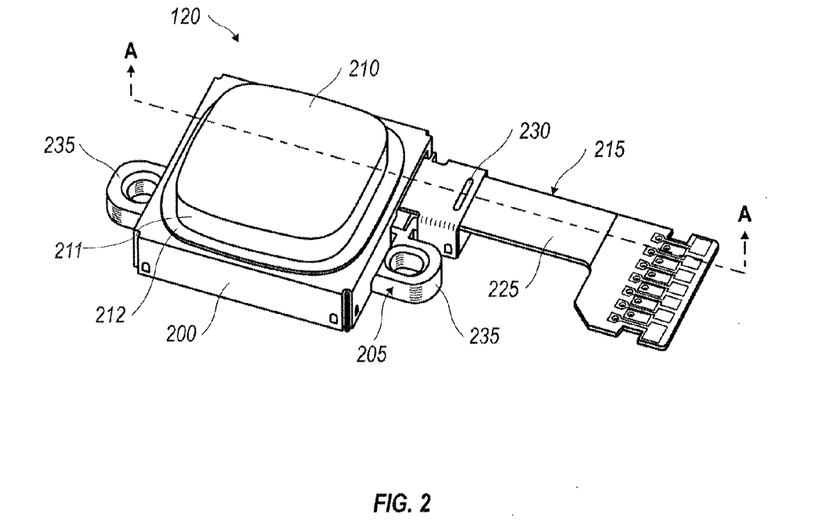
FIG. 2 is an elevational view of a navigation tool holder coupled with a navigation tool in accordance with an exemplary implementation of the present disclosure.

FIG. 2 is an exemplary implementation of an assembled navigation tool module 120. The exemplary implementation illustrated in FIG. 2 includes a navigation tool 210 housed between a top holder 200 and a bottom holder 205. The illustrated navigation tool 210 is an optical trackpad; however, one of ordinary skill in the art will appreciate that the navigation tool 210 can also be an optical trackball, a jog ball, or any other optical navigation tool or mechanical navigation tool which can be housed between a top holder 200 and a bottom holder 205. The exemplary navigation tool 210 further includes a central portion 211 and a flexible circuit 215 extending from the central portion 211. The central portion 211 further includes the exposed portion or the top portion of the navigation tool 210 which protrudes through the opening of the top holder 200. The top portion or the exposed portion of the navigation tool 210 can be the portion which the user engages to enter inputs to the mobile device 100. The flexible circuit 215 is adapted to be coupled to a circuit board of a mobile device. In FIG. 2, the flexible circuit 215 is a flexible strip having a first end 220 (shown in FIG. 5) and a second end 225 opposite to the first end 220. The second end 225 extends out and away from the top holder 200 and the bottom holder 205.

The exemplary top holder 200 of FIG. 2 is a five sided box-like structure having four walls and a top surface. The top surface forms an opening 207 (illustrated in FIGS. 4-5) through which the navigation tool 210 protrudes. The top holder 200 illustrated in FIG. 2 further includes a dimple 230 adapted to clamp the first end 220 of the flexible circuit 215 against the bottom holder 205 and to clamp the first end 220 of the flexible circuit 215 between the top holder 200 and the bottom holder 205. In FIG. 2, the top holder 200 is made of a metal; however other materials, such as plastic, a composite fiber, other durable materials, or a combination of durable materials can be implemented.

FIG. 2 illustrates an exemplary implementation where the top holder 200 is configured for snap engagement with the bottom holder 205. The bottom holder 205 is configured to matingly engage with the top holder 200 to house the navigation tool 210. In FIG. 2, the bottom holder 205 includes a pair of projections 235 each adjoined to at least one side of the bottom holder 205 and forming an aperture for receiving a protrusion of the circuit board 700 (shown in FIG. 7) or a fastener to secure the navigation tool module 120 to the circuit board 700. The projections 235 are adapted to engage a circuit board of a mobile device. While the illustrated implementation in FIG. 2 show a pair of projections 235, one of ordinary skill in the art will appreciate that fewer or more projections 235 can be implemented to couple the navigation tool module 120 to the mobile device 100. Additionally, one of ordinary skill in the art will also appreciate that the projection 235 can be a lobe, ring, or any other structure that allows for the securement of the bottom holder 205 to a circuit board of the mobile device 100, either releasable securement or fixed securement. Further details of the top holder 200 and the bottom holder 205 will be discussed in relation to FIGS. 3-5.

The navigation tool module 120 illustrated in FIG. 2 also includes a spacer 212 coupled to the top surface of the top holder 200. The spacer 212 substantially surrounds the central portion 211 of the navigation tool 210 that protrudes through the opening of the top holder 200. The spacer 212 can be a layer of elastic material such as rubber, silicon rubber, synthetic rubber, or any other elastomeric material that can be coupled to the top holder 200 such that the spacer 212 is interposed between the top holder 200 and a housing frame 105 of a mobile device 100. In other implementations, the spacer 212 can be a plastic, a cloth, a paper, or other compressible or semi-compressible material which can be partially compressed or deformed to provide a compression fitting between the navigation tool 210 and the top holder 200. In an alternative implementation, the spacer 212 can also be a cover, such as an elastic cover which is layered on top of the top holder 200. In other words, the spacer 212 can cover the opening 207 of the top holder 200, thereby providing a cushioning between the top holder 200 and the navigation tool 210. In at least one example, the spacer 212 has a thickness and a groove can be formed within the thickness for receiving the opening 207 of the top holder 200.

Figure 3:
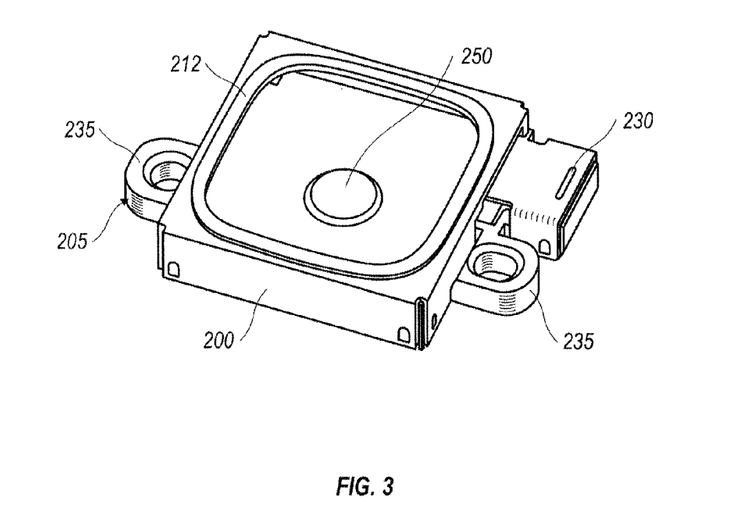
FIG. 3 is an elevational view of a navigation tool holder in accordance with an exemplary implementation of the present disclosure.

FIG. 3 is an illustration of the top holder 200 and the bottom holder 205 of the navigation tool module 120 illustrated in FIG. 2 assembled without a navigation tool. As illustrated in FIG. 3, the top holder 200 and the bottom holder 205 are snap-engaged. The top holder 200 can include a flexible circuit cover 240. The bottom holder 205 can include a flexible circuit bottom 245 (shown in FIG. 5) configured for mating engagement with the flexible circuit cover 240. The flexible circuit cover 240 and the flexible circuit bottom 245 can be adapted for snap engagement (as illustrated in FIG. 3) or any other arrangement, so long as a slot (not shown) is formed therebetween. The slot can be provided so that the flexible circuit 215 of the navigation tool 210 can extend through the slot and be interposed between the flexible circuit cover 240 and the flexible circuit bottom 245. The dimple 230 of the top holder 200 is formed on the flexible circuit cover 240 and is provided to clamp or otherwise hold the flexible circuit 215 against the flexible circuit bottom 245 of the bottom holder 205.

The exemplary implementation of the bottom holder 205 in FIG. 3 also includes a switch 250. The switch 250 is adapted for engagement by the navigation tool 210 (shown in FIG. 2). For example, the navigation tool 210 can be pressed, depressed, pushed, or otherwise press-actuated. When the navigation tool 210 is pressed down, the bottom surface of the navigation tool 210 contacts the switch 250, thereby closing the switching. The closing of the switch 250 can enter an input to a processor (not shown) of the mobile device 100. While the illustrated implementation of FIG. 3 shows the switch 250 positioned in the center of the bottom holder 205, one of ordinary skill in the art will appreciate that the switch 250 can be placed anywhere on the bottom holder 205 or can be integrated onto a surface in the navigation tool 210, so long as the switch 250 can be closed upon press-actuation of the navigation tool 210.

FIG. 3 also illustrates the opening 207 formed through the upper surface of the top holder 200. The opening 207 is provided to expose a top portion of the central portion 211 (shown in FIG. 2) of the navigation tool 210, thereby allowing a user of the navigation tool module 120 to enter inputs at the navigation tool 210.

The illustrated implementation of FIG. 3 further includes the spacer 212 co-molded to the top holder 200. More specifically, the spacer 212 is co-molded to the edge of the top holder 200 that forms the opening 207. As the spacer 212 is co-molded to the edge of the top holder, the spacer 212 can substantially surround the central portion 211 of the navigation tool 210 and can be interposed between the navigation tool 210 and the edge of the top holder 200. While the implementation in FIG. 3 illustrates a co-molded spacer 212, one of ordinary skill in the art will appreciate that the spacer 212 can be affixed to the top holder 200 by adhesives, by fasteners, by form-fitting a gap of the spacer 212 to the edge of the top holder 200, or by any other affixing or coupling means.

Figure 4:
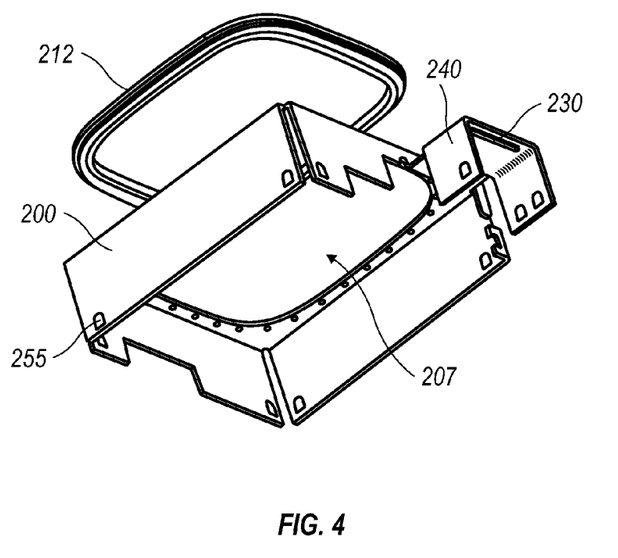
FIG. 4 is an exploded view of a portion of the navigation tool holder illustrated in FIG. 3 in accordance with an exemplary implementation of the present disclosure.

FIG. 4 is an exploded view of the spacer 212 and the top holder 200 of the navigation tool module 120 illustrated in FIGS. 2 and 3. As illustrated in FIG. 4, the spacer 212 is shaped to correspond to the opening 207 formed by the top holder 200. The spacer 212 can also be adapted to cover the edge of the top holder 200 that forms the opening 207 such that the spacer 212 covers a topside and an underside of the top holder 200 proximate to the opening 207.

Additionally, FIG. 4 further illustrates the shape and structure of at least one exemplary implementation of the top holder 200. In FIG. 4, the top holder 200 is a five-sided box structure having four sides, a top surface which forms the opening 207, and a flexible circuit cover 240. The flexible circuit cover 240 extends from a side of the top holder 200 and comprises a top and two sides. Each of the sides of the top holder, including the sides of the flexible circuit cover 240 has a hole 255 adapted to engage a hook 260 (shown in FIG. 5) of the bottom holder 205. Also illustrated in FIG. 4, the dimple 230 is formed on the top of the flexible circuit cover 240. The dimple 230 forms a recess in the upper surface of the top of the flexible circuit cover 240 and forms a bump on the underside of the flexible circuit cover 240. The interaction between the dimple 230 and the flexible circuit 215 will be discussed in further detail with respect to FIGS. 5-7.

Figure 5:
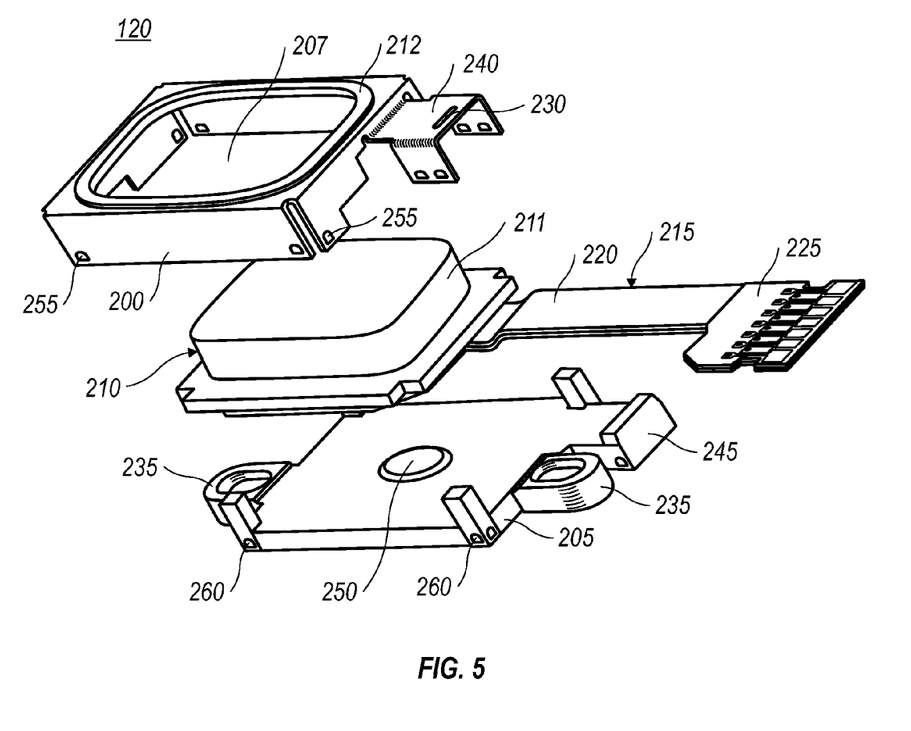
FIG. 5 is an exploded view of the navigation tool holder and navigation tool illustrated in FIG. 2 in accordance with an exemplary implementation of the present disclosure.

FIG. 5 is an exploded view of the navigation tool module 120 illustrated in FIG. 2. In the illustrated implementation of FIG. 5, the top holder 200 and the bottom holder 205 are configured for snap engagement. The bottom holder 205 includes a plurality of hooks 260 that are adapted for engagement with the holes 255 provided on the top holder 200. In FIG. 5, the navigation tool 210 is interposed between the top holder 200 and the bottom holder 205 such that the top portion 211 of the navigation tool protrudes through the opening 207 of the top holder 200. When the top holder 200 is placed on top of the navigation tool 210 to matingly engage with the bottom holder 205, the hooks 260 of the bottom holder 205 engage and catch the holes 255 of the top holder 200. In other words, the top holder 200 snaps together with the bottom holder 205 to house and secure the navigation tool 210 therebetween. While the illustrated implementation shows hooks 260 that snap into the holes 255 of the top holder 200, one of ordinary skill in the art will appreciate that the hooks 260 can be knobs, pegs, or any other protuberance that will provide a mating engagement with the top holder 200. Additionally, one of ordinary skill in the art will appreciate that fewer or more hooks 260 and holes 255 can be provided on the bottom holder 205 and top holder 200, respectively, than are illustrated in FIG. 5.

FIG. 5 also illustrates the details of the interaction between the flexible strip 215, the dimple 230 of the top holder 200, and the bottom holder 205. The bottom holder 205 includes a flexible circuit bottom 245 that is positioned on the bottom holder 205 to correspond to the flexible circuit cover 240. In at least one implementation, the flexible circuit bottom 245 is adapted to snap engage with the flexible circuit cover 240. As illustrated in FIG. 5, the dimple 240 is adapted to clamp the flexible circuit 215 against the flexible circuit bottom 245. For example, in the illustrated implementation, the dimple 230 clamps the first end 220 of the flexible strip between the flexible circuit cover 240 and the flexible circuit bottom 245, thereby leaving the second end 225 of the flexible strip 215 exposed and extending away from the top holder 200 and the bottom holder 204. Additionally, in FIG. 5, as the length and width of the flexible circuit cover 240 and the flexible circuit bottom 245 are fixed, the length of the first end 220 of the flexible circuit 215 that will be clamped between the top holder 200 and the bottom holder 205 will be constant, regardless of the total length of the flexible circuit 215 extended from the central portion 211 of the navigation tool 210.

Figure 6:
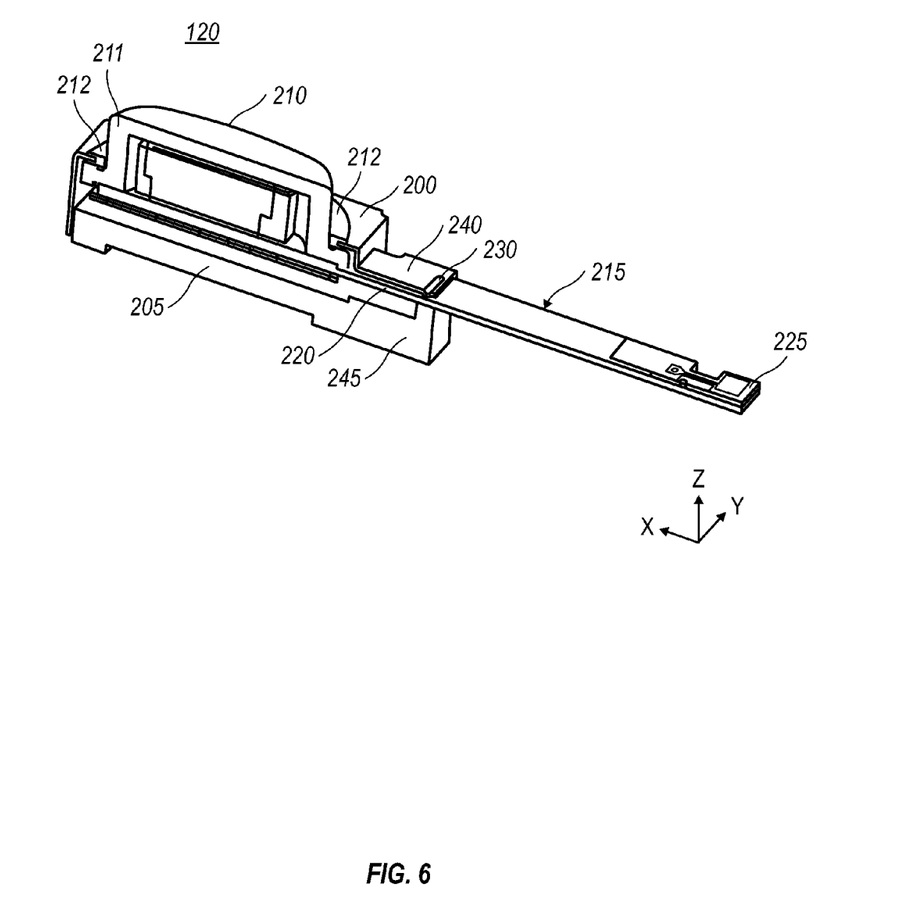
FIG. 6 is a cross-sectional view of the navigation tool holder and navigation tool illustrated in FIG. 2 taken along the A-A line.

FIG. 6 is a cross-sectional view of the navigation tool module 120 illustrated in FIG. 2 taken along the A-A line. The top holder 200, bottom holder 205, and the spacer 212 contain the navigation tool 210 therein and constrain the movement of the navigation tool 210, thereby preventing the navigation tool 210 from becoming substantially misaligned within the navigation tool holder (i.e. top holder 200, bottom holder 205, and spacer 212). For example, the opening 207 of the top holder 200 can constrain the navigation tool 210 in an X-Y plane, as the edge of the top holder 200 that forms the opening 207 limits the movement and prevents shifting of the navigation tool 210 in the X and Y directions. The spacer 212 constrains the navigation tool 210 in the X-Y plane as the spacer 212 further limits the X and Y directional movement of the navigation tool 210 within the opening 207. For example, the spacer 212 reduces the gap between the top holder 200 and the navigation tool 210, thereby reducing the amount of space the navigation tool 210 can move within the opening 207 in the X-Y plane. The bottom holder 205 provides a surface that acts as a bottom constraint for the navigation tool 210, thereby ensuring a portion of the navigation tool 210 protrudes through the opening 207 of the top holder 200. The bottom holder 205 also provides a surface on which the navigation tool 210 can press against, and thus provides tactile feedback, when the navigation tool 210 is press-actuated for entering inputs to the mobile device 100. Additionally, the bottom holder 205 prevents the navigation tool 210 from slipping out of the opening 207 when the navigation tool 210 is press-actuated, as the bottom holder 205 acts as a bottom boundary for the navigation tool 210.

FIG. 6 further illustrates the interaction between the flexible circuit cover 240, the dimple 230, the flexible circuit bottom 245, and the flexible circuit 215 when the navigation tool module 120 is assembled. In an assembled configuration, the dimple 230 of the flexible circuit cover 240 contacts the first end 220 of the flexible circuit 215. As the underside of the dimple 230 is a bump, the bump presses and clamps the first end 220 of the flexible circuit 215 against the flexible circuit bottom 245 of the bottom holder 205. As a result, the first end 220 of the flexible circuit 215 is isolated from the second end 225 such that the second end 225 is exposed and extends out from the slot formed by the engagement of the flexible circuit cover 240 and the flexible circuit bottom 245. Therefore, the flexible circuit 215 is firmly held at a pre-designated point (for example, at the dimple 230). The same length of flexible circuit 215 is housed between the top holder 200 and the bottom holder 205, regardless of the total length of the flexible circuit 215. Additionally, as the top holder 200 and the bottom holder 205 keep the first end 220 of the flexible circuit 215 in a flat position, when the navigation tool 210 is press-actuated, less of the flexible circuit 215 is bent, and the possibility of the navigation tool 210 becoming misaligned is reduced. When the navigation tool 210 is pressed-actuated to an actuated position, the first end 220 is bent. The first end 220 is returned to the flat status when the navigation tool 210 is returned to an unactuated position. In other words, the bending of the flexible circuit 215 which can affect the alignment of the navigation tool 210 within the opening 207 of the top holder 200 is isolated to the first end 220 of the flexible circuit 215, thereby reducing the possibility that the navigation tool 210 become misaligned. Essentially, the flexible circuit cover 240 and the flexible circuit bottom 245 pinch the first end 220 of the flexible circuit 215 therebetween to press and firmly hold the flexible circuit in place, thereby isolating the flexible circuit tolerance impact resulting from user-engagement and press-actuations of the navigation tool 210 to the first end 220 of the flexible circuit 215.

While the implementations illustrated herein include a flexible circuit cover 240 and a flexible circuit bottom 245, one of ordinary skill in the art will appreciate that the navigation tool module 120 need not include the flexible circuit cover 240 and the flexible circuit bottom 245. Rather, the flexible circuit 215 of the navigation tool 210 can extend freely out from a slot formed between the top holder 200 and the bottom holder 205.

Figure 7:
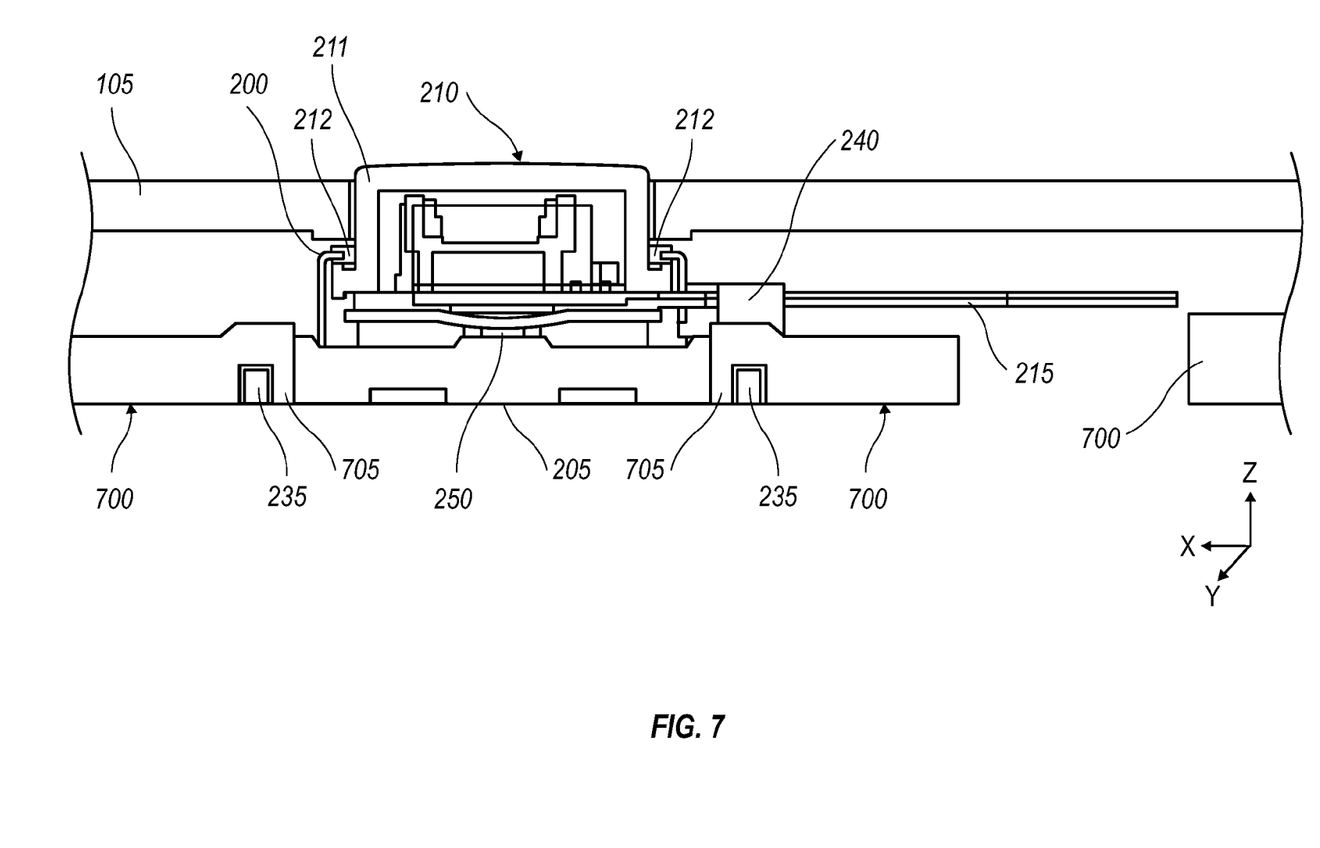
FIG. 7 is a cross-sectional view of a navigation tool housed in a navigation tool holder assembled in a mobile device.

FIG. 7 is a cross-sectional view of the navigation tool module 120 illustrated in FIG. 2 assembled between a housing frame 105 and a circuit board 700 of a mobile device 100. FIG. 7 further illustrates how the navigation tool 210 is constrained by the navigation tool holder (i.e. top holder 200, bottom holder 205, and spacer 212). The navigation tool module 120 is communicatively coupled to a circuit board 700 of the mobile device 100. In the illustrated implementation, the projection 235 of the bottom holder 205 is configured to engage a protrusion 705 of the circuit board 700. For example, the projection 235 of the bottom holder 205 (as shown in FIGS. 2-5) forms a hole for receiving a fastener or protrusion 705 of the circuit board 700. When the navigation tool module 120 is coupled to the circuit board 700, the protrusion 705 of the circuit board 700 is inserted through the hole of the projection 235. As a result, the navigation tool module 120 is secured to the circuit board 700. While the illustrated implementation in FIG. 7 shows a protrusion 705 and projection 235 arrangement, the navigation tool module 120 can be secured to the circuit board 700 by adhesives, soldering, or any other coupling arrangement that will secure the navigation tool module 120 to the circuit board 700.

Figure 10:
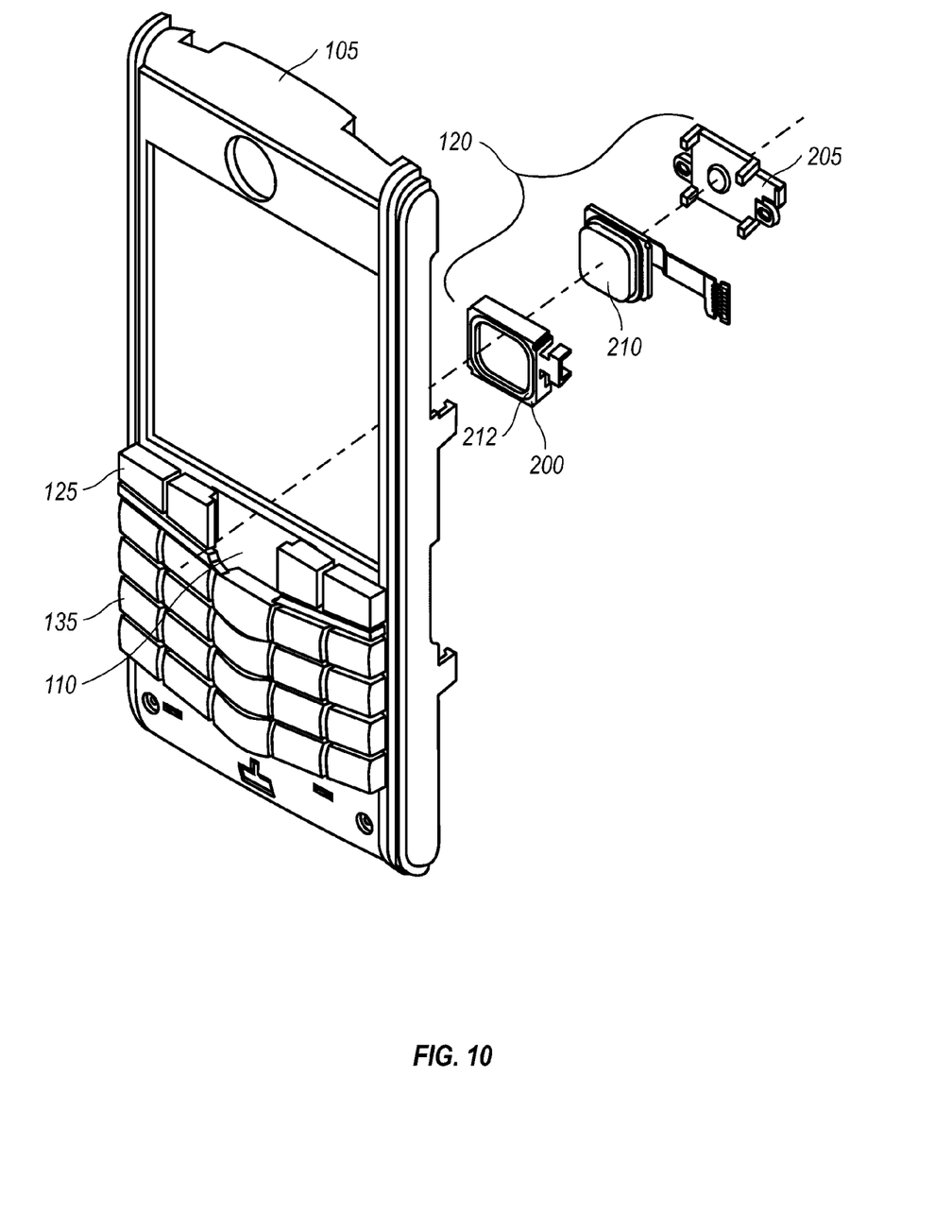
FIG. 10 is an elevational view of a support frame of a mobile device configured to be coupled with a navigation tool housed in a navigation tool holder in accordance with an exemplary implementation of the present disclosure.
Figure 11:
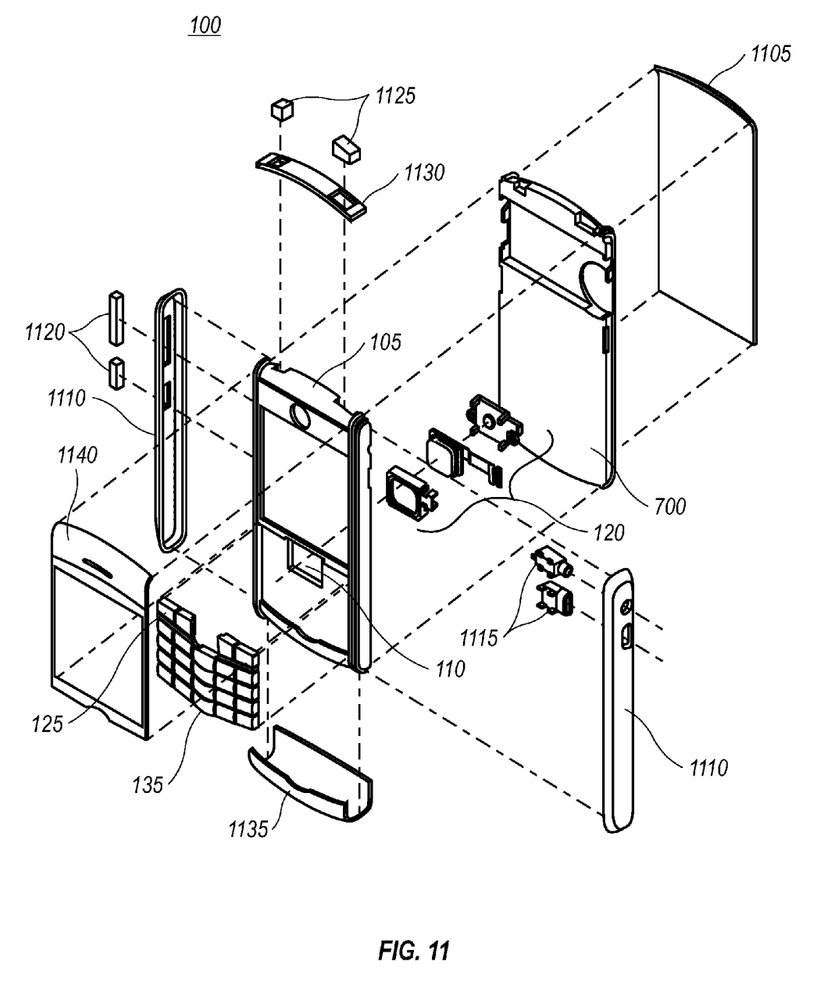
FIG. 11 is an exploded view of a mobile device assembled with a navigation tool housed in a navigation tool holder in accordance with an exemplary implementation of the present disclosure.
Figure 12:
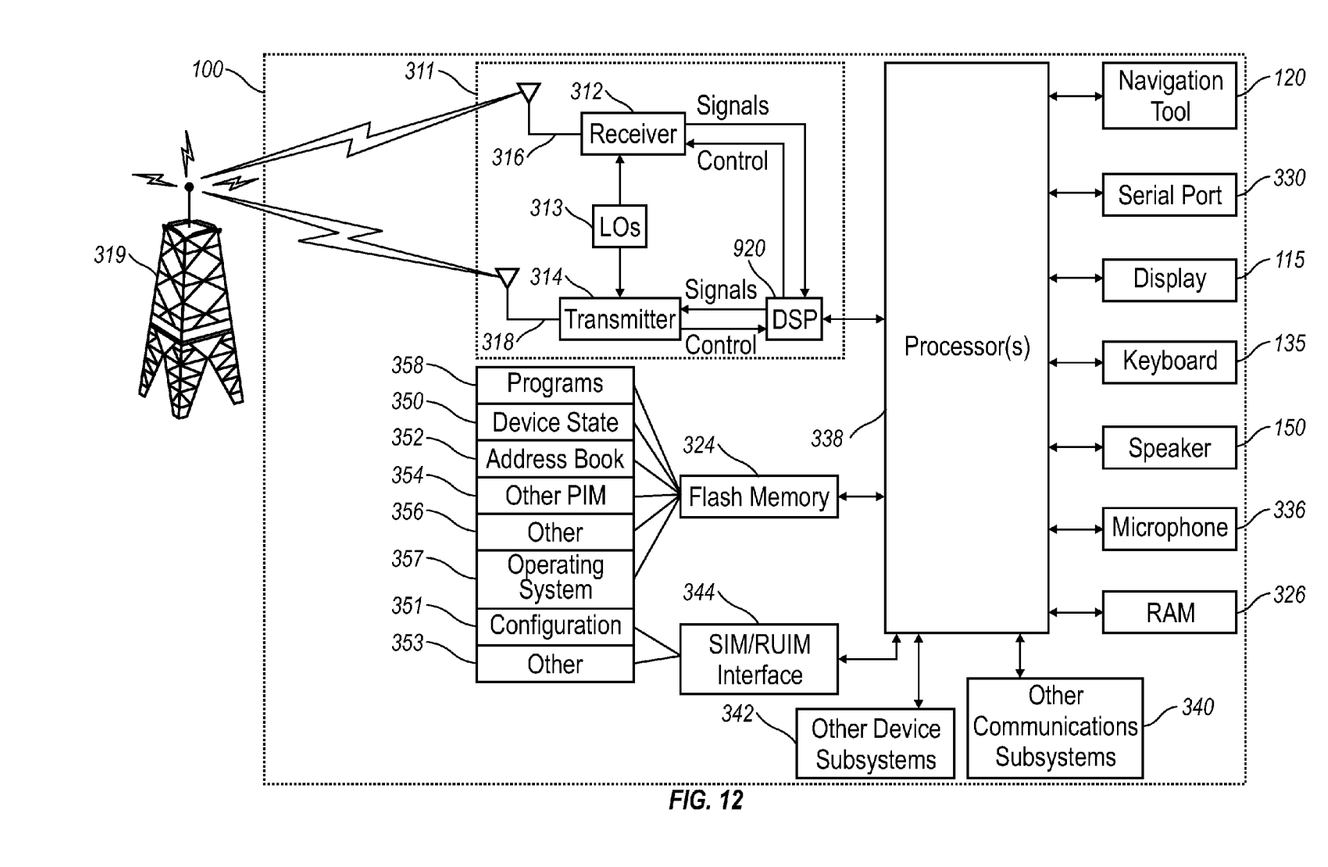
FIG. 12 is a block diagram representing a mobile device interacting in a communication network.

The housing frame 105 is placed on top of the navigation tool module 120 such that the top portion of the navigation tool 210 protrudes through the navigation tool module aperture 110 (shown in FIGS. 10-12). As illustrated in FIG. 7, the top holder 200 of the navigation tool module 120 can be positioned beneath the housing frame 105 such that the housing frame 105 acts as an upper boundary of the top holder 200. As a result, the top holder 200 and the bottom holder 205 are bound by the housing frame 105 and the circuit board 700, thereby holding the navigation tool 210 and the navigation tool module 120 in place in the Z-direction. Additionally, the housing frame 105 prevents navigation tool 210 from popping out of the aperture 112. The aperture 107 in housing frame 105 constrains the navigation tool 210 in the X- and Y-directions. As the edges of the housing frame 105 forming the aperture 107 limit the amount of movement of the navigation tool 210 in the X and Y-directions, the navigation tool 210 is less likely to shift and become misaligned.

The navigation tool 210 is further constrained in the X, Y, and Z-direction by the spacer 212 substantially surrounding the navigation tool 210. As the spacer 212 illustrated in the exemplary implementation of FIG. 7 is co-molded to the edge of the top holder 200 forming the opening 207, the spacer 212 reduces the gap between the top holder 200 and the navigation tool 210, thereby limiting the X and Y-direction movement of the navigation tool 210 within the opening 207. As a result, the ability of the navigation tool 210 to shift out of alignment is reduced. The spacer 212 also constrains the navigation tool 210 and the navigation tool module 120 in the Z-direction. For example, the spacer 212 reduces the gap between the housing frame 105 and the top surface of the top holder 200. As a result, the ability of the navigation tool module 120 to move in the Z-direction and the possibility that the navigation tool module 120 can pop out of the mobile device 100 is reduced. As the spacer 212 can be made of an elastomer, a rubber, or any other compressible material, the spacer 212 is resilient. Additionally, the top holder 200 and the housing frame 105 can compress or pinch the spacer 212 therebetween to hold the navigation tool 210 in place within the housing of the mobile device 100.

As the top holder 200, bottom holder 205, and spacer 212 cooperate with the housing frame 105 and the circuit board 700, the alignment of the navigation tool 210 within the aperture 110 of the housing frame 105 is maintained. The ability of the navigation tool 210 to tilt and shift within the navigation tool module 120 and within the aperture 110 of the housing frame 105 is reduced. As a result, the navigation tool module 120 maintains a substantially concentric alignment with the aperture 110 of the housing frame 105.

Additionally, the first end 220 (shown in FIG. 6) of the flexible circuit 215 is maintained in a flat status by the flexible circuit cover 240 and the bottom holder 205 in order to isolate the second end 225 (shown in FIG. 6) from the shifting or bending effects that result from press-actuations and user engagements with the navigation tool 210. In other words, the flexible circuit cover 240 and the bottom holder 205 provide the bending point of the flexible circuit 215. As a result, the second end 225 of the flexible circuit 215 will not bend, and the portion of the flexible circuit 215 between the central portion 211 of the navigation tool 210 and the flexible circuit cover 240 will be bent when the navigation tool 210 is press-actuated. The first portion 220 of the flexible circuit 215 pressed between the flexible circuit cover 240 and the bottom holder 205 is held firmly therebetween, thereby further constraining the movement of the navigation tool 210 from shifting or tilting out of alignment.

Figure 8:
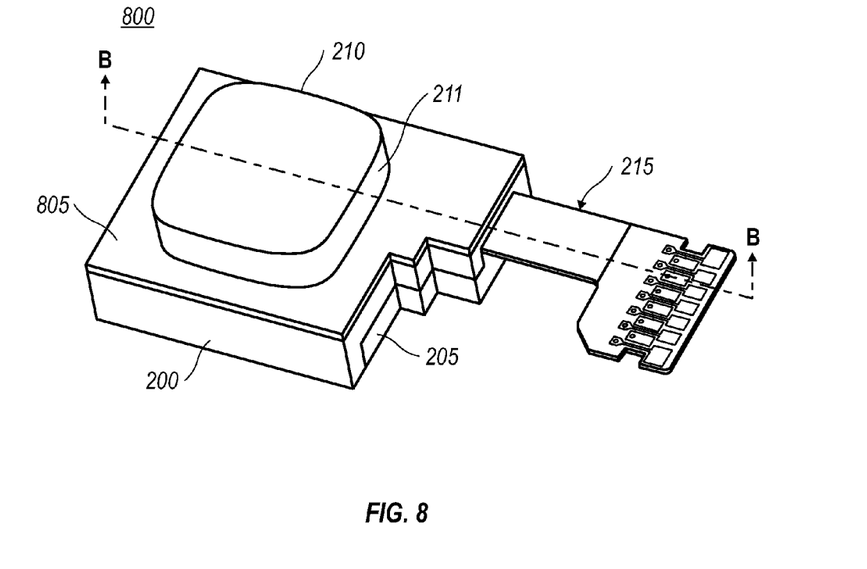
FIG. 8 is an elevational view of a navigation tool housed in a navigation tool holder including a cover in accordance with an exemplary implementation of the present disclosure.

FIG. 8 is an alternative implementation of a navigation tool module 800. The navigation tool module 800 illustrated in FIG. 8 is substantially similar to the navigation tool module 120 illustrated in FIG. 2. However, instead of a spacer 212 that is co-molded to the edge of the top holder 200 defining the opening 207, the navigation tool module 800 has an elastic cover 805 layered over the top surface of the top holder 200 and substantially surrounding the top portion 211 of the navigation tool 210 protruding through the opening of the top holder 200.

Figure 9:
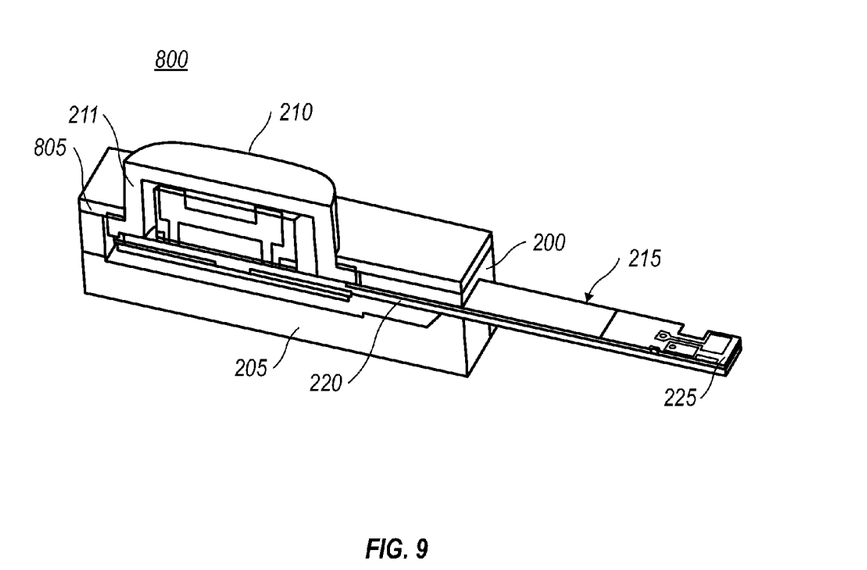
FIG. 9 is a cross-sectional view of the navigation tool housed in a navigation tool holder illustrated in FIG. 8 taken along the B-B line.

FIG. 9 is a cross-sectional view of the navigation tool module 800 illustrated in FIG. 8 taken along the B-B line. As illustrated in FIG. 9, the elastic cover 805 is layered over nearly the entire top surface of the top holder 200. Further, while the illustrated implementation in FIG. 9 does not include a dimple formed on the top holder 200, the top holder 200 and the bottom holder 205 are configured to matingly engage such that a first end 220 of the flexible circuit 215 is pressed therebetween to provide a bending point for the flexible circuit 215 and to isolate the first end 220 of the flexible circuit from the second end 225. In an alternative implementation, a dimple can be formed on the top surface of the top holder 200 and can be covered by the elastic cover 805.

FIG. 10 illustrates the assembly of the navigation tool module 120 with a housing frame 105. In FIG. 10, the keyboard 135 and the function key row 125 are assembled to the housing frame 105. The housing frame 105 can form a navigation tool module aperture 110 to receive the navigation tool module 120. The top holder 200 of the navigation tool module 120 is received through the navigation tool module aperture 110 from a rear side of the housing frame 105. The navigation tool 210 is assembled with the top holder 200 such that a top portion of the navigation tool 210 protrudes through an opening of the top holder 200. The bottom holder 205 is matingly engaged (for example, snap engaged) with the top holder 200, thereby encasing and securing the navigation tool 210 therebetween. When the navigation tool module 120 is assembled to the housing frame 105, the top portion of the navigation tool 210 protrudes through the opening of the top holder 200 and the navigation tool module aperture 110 of the housing frame 105. In the illustrated implementation of FIG. 10, the height of the exposed top portion of the navigation tool 210 through the opening of the top holder 200 can be the same as the height of the keys of the keyboard 135 or of the keys of the function key row 125. In alternative implementations, the height of the exposed top portion of the navigation tool 210 can be taller or shorter than the height of the keys of the keyboard 135. Additionally, the exposed top portion of the navigation tool 210 can be taller or shorter than the height of the keys of the function key row 125.

FIG. 11 illustrates the integration of the navigation tool module 120 into mobile device 100 in an exploded view showing some of the typical components found in the assembly of the mobile device 100. The construction of the device 100 benefits from various manufacturing simplifications. The internal components are constructed on a single PCB (printed circuit board) 700. The keyboard 135 is constructed from a single piece of material, and in an exemplary implementation is made from plastic. The keyboard 135 sits over dome switches (not shown) located on the PCB 700 in one implementation. One switch is provided for every key on the keyboard in this implementation, but in other implementations more than one switch or less than one switch per key are possible configurations. In FIG. 11, the device 100 comprises a multiple-pieced housing (e.g., a housing having a support frame 105 and a back frame 1105). The support frame 105 holds the keyboard 135 and navigation tool module 120 in place above the PCB 700. The support frame 105 also provides an attachment point for the display 115 (not shown). A lens 1140 covers the display to prevent damage. When assembled, the support frame 105 and the PCB 700 are fixably attached to each other and the display is positioned between the PCB 700 and support frame 105.

The navigation tool module 120 can be frictionally engaged with the support frame 105, when the device is assembled. Additionally the navigation tool module 120 can be coupled to the PCB 700. For example, the bottom holder 205 of the navigation tool module 120 can be adhesively coupled, soldered, affixed, or connected to the PCB 700. In at last one implementation, the bottom holder 205 can have a projection (for example an ear) configured to engage and connect to a protrusion of the PCB 700.

A serial port (such as, but not limited to, a Universal Serial Bus port) and an earphone jack 1115 are fixably attached to the PCB 700 and further held in place by a side frame 1110. Buttons 1120 are attached to switches (not shown), which are connected to the PCB 700 and held in place by a side frame 1110. Further, additional top buttons 1125 (for example, a power button, a silence button, or the like) can be fixably attached to the PCB 700 and held in place by a top piece 1130.

Final assembly involves placing the top piece 1130 and bottom piece 1135 in contact with support frame 105. Furthermore, the assembly interconnects side frames 1110 with the support frame 105, PCB 700, and lens 1140. These side frames 1110 provide additional protection and strength to the support structure of the device 100. In one implementation, a back frame 1105 is removably attached to the other elements of the device.

While the figures described herein, illustrated a navigation tool module 120 incorporated on a mobile device 100 having a physical keyboard 135, one of ordinary skill in the art will appreciate that the navigation tool module 120 can be implemented on a mobile device 100 simply having a touch-sensitive display with a virtual keyboard. In another implementation, the navigation tool module 120 can be implemented on a mobile device having a slide-out or hidden physical keyboard that is hidden by a display portion, where the navigation tool module 120 is placed on the display portion.

FIG. 12 is a block diagram of the electronic device 100 depicted in at least FIG. 1 that includes a navigation tool housed in a navigation tool holder in accordance with any of the implementations described herein. A communication subsystem 311 performs all communication transmission and reception with the wireless network 319. The processor module 138 further can be connected with an auxiliary input/output (I/O) subsystem 328 which can be connected to the communication device 100. In at least one implementation, the processor module 138 can be connected to a serial port (for example, a Universal Serial Bus port) 330 which can allow for communication with other devices or systems. The display 115 can be connected to the processor module 338 to allow for displaying of information to an operator of the communication device 100. When the communication device 100 is equipped with the keyboard 135, the keyboard 135 can also be connected with the processor module 338. A keyboard controller can be in communication with the processor in order to send or relay messages corresponding to key pressings of the keyboard 135 to the processor 338. Dome switches and a circuit board 700 can be in communication with the keyboard controller and the processor module 338 to send and relay messages corresponding to key pressings of the keyboard 135. The communication device 100 can include the audio port 150, a microphone 336, random access memory (RAM) 326, and flash memory 324, all of which can be connected to the processor module 338. Other similar components can be provided on the device 100 as well and optionally connected to the processor module 338. Other communication subsystems 340 and other communication device subsystems 342 are generally indicated as being functionally connected with the processor module 338 as well. An example of a communication subsystem 340 is that of a short range communication system such as BLUETOOTH® communication module or a WI-FI® communication module (a communication module in compliance with IEEE 802.11 set of protocols) and associated circuits and components. The processor module 138 is able to perform operating system functions and enables execution of programs on the communication device 100. In some implementations not all of the above components can be included in the communication device 100.

The auxiliary I/O subsystem (shown as "navigation tool" in FIG. 12) can take the form of a trackpad navigation tool module 120 as illustrated in the exemplary implementation shown in FIG. 1, or an optical trackball, touch-sensitive interface, or other I/O interface. While the above examples have been provided in relation to the auxiliary I/O subsystem, other subsystems capable of providing input or receiving output from the communication device 100 are considered within the scope of this disclosure. Other keys can be placed along the side of the communication device 100 to function as escape keys, volume control keys, scrolling keys, power switches, or user programmable keys, and can likewise be programmed accordingly.

Furthermore, the communication device 100 is equipped with components to enable operation of various programs, as shown in FIG. 12. In an exemplary implementation, the flash memory 324 is enabled to provide a storage location for the operating system 357, device programs 358, and data. The operating system 357 is generally configured to manage other programs 358 that are also stored in memory 324 and executable on the processor. The operating system 357 honors requests for services made by programs 358 through predefined program 358 interfaces. More specifically, the operating system 357 typically determines the order in which multiple programs 358 are executed on the processor and the execution time allotted for each program 358, manages the sharing of memory 324 among multiple programs 358, handles input and output to and from other device subsystems 342, and so on. In addition, operators can typically interact directly with the operating system 357 through a user interface which can include the keyboard 135 and display screen 115. While in an exemplary implementation the operating system 357 is stored in flash memory 324, the operating system 357 in other implementations is stored in read-only memory (ROM) or similar storage element (not shown). As those skilled in the art will appreciate, the operating system 357, device program 358 or parts thereof can be loaded in RAM 326 or other volatile memory.

In one exemplary implementation, the flash memory 324 contains programs 358 for execution on the communication device 100 including an address book 352, a personal information manager (PIM) 354, and the device state 350. Furthermore, programs 358 and other information 356 including data can be segregated upon storage in the flash memory 324 of the communication device 100.

When the communication device 100 is enabled for two-way communication within the wireless communication network 319, it can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different communication devices 100. The communication device 100 can be able to operate some features without a SIM/RUIM card, but it will not be able to communicate with the network 319. A SIM/RUIM interface 344 located within the communication device 100 allows for removal or insertion of a SIM/RUIM card (not shown). The SIM/RUIM card features memory and holds key configurations 351, and other information 353 such as identification and subscriber related information. With a properly enabled communication device 100, two-way communication between the communication device 100 and communication network 319 is possible.

If the communication device 100 is enabled as described above or the communication network 319 does not require such enablement, the two-way communication enabled communication device 100 is able to both transmit and receive information from the communication network 319. The transfer of communication can be from the communication device 100 or to the communication device 100. In order to communicate with the communication network 319, the communication device 100 in the presently described exemplary implementation is equipped with an integral or internal antenna 318 for transmitting messages to the communication network 319. Likewise the communication device 100 in the presently described exemplary implementation is equipped with another antenna 316 for receiving communication from the communication network 319. These antennae (316, 318) in another exemplary implementation are combined into a single antenna (not shown). As one skilled in the art would appreciate, the antenna or antennae (316, 318) in another implementation are externally mounted on the communication device 100.

When equipped for two-way communication, the communication device 100 features a communication subsystem 311. As is understood in the art, this communication subsystem 311 is modified so that it can support the operational needs of the communication device 100. The subsystem 311 includes a transmitter 314 and receiver 312 including the associated antenna or antennae (316, 318) as described above, local oscillators (LOs) 313, and a processing module 320 which in the presently described exemplary implementation is a digital signal processor (DSP) 320.

It is contemplated that communication by the communication device 100 with the wireless network 319 can be any type of communication that both the wireless network 319 and communication device 100 are enabled to transmit, receive and process. In general, these can be classified as voice and data. Voice communication generally refers to communication in which messages for audible sounds are transmitted by the communication device 100 through the communication network 319. Data generally refers to all other types of communication that the communication device 100 is capable of performing within the constraints of the wireless network 319.

Example device programs that can depend on such data include email, contacts and calendars. For each such program, synchronization with home-based versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the communication device 100 is enhanced when connectable within a communication system, and when connectable on a wireless basis in the network 319 in which voice, text messaging, and other data transfer are accommodated.

Exemplary implementations have been described hereinabove regarding a navigation tool holder. One of ordinary skill in the art will appreciate that the features in each of the figures described herein can be combined with one another and arranged to achieve the described benefits of the presently disclosed navigation tool holder of a mobile device 100. Additionally, one of ordinary skill will appreciate that the elements and features from the illustrated implementations herein can be optionally included to achieve the described benefits of the presently disclosed navigation tool holder. Various modifications to and departures from the disclosed implementations will occur to those having skill in the art. The subject matter that is intended to be within the spirit of this disclosure is set forth in the following claims.

What is claimed is:

1. A mobile device comprising:
a navigation tool that receives optical input, the navigation tool having a top portion, a bottom portion, and a flexible circuit, the flexible circuit having a first end proximate to the top portion and a second end that extends in a lateral direction away from the top portion;
a navigation tool holder comprising:
a bottom holder including a lower clamp portion and a switch adapted for engagement by the navigation tool;
a top holder configured to matingly engage the bottom holder to secure the navigation tool in x-,y-, and z-directions, the top holder including an upper clamp portion that matingly engages the lower clamp portion to define a slot that receives the flexible circuit therebetween, such that the flexible circuit is frictionally engaged at the slot by the upper clamp portion and the lower clamp portion,
the flexible circuit extending outside the navigational tool holder at a location of engagement by the upper clamp portion and the lower clamp portion, the location of engagement defining a bending point for the flexible circuit when the navigation tool is vertically displaced within the navigation tool holder to engage the switch with the bottom portion, the top holder further including an aperture positioned to receive the top portion of the navigation tool therethrough; and
a spacer provided at the aperture, the spacer being configured to constrain the vertically displaced navigation tool.

2. The mobile device of claim 1, wherein the top holder and the bottom holder are configured for snap engagement.

3. The mobile device of claim 1, wherein the navigation tool is one of an optical trackball, an optical trackpad, an optical omnidirectional joystick, and an optical jogball.

4. The mobile device of claim 1, wherein the first end of the flexible circuit is interposed between the lower clamp portion and the upper clamp portion and the second end of the flexible circuit is opposite from the first end and extends away from the top holder and the bottom holder.

5. The mobile device of claim 4, wherein the upper clamp portion comprises a dimple that extends from the upper clamp portion to engage the first end of the flexible circuit.

6. The mobile device of claim 1, wherein the spacer is co-molded to the top holder.

7. The mobile device of claim 1, wherein the bottom holder is plastic.

8. The mobile device of claim 1, wherein the top holder is metal.

9. The mobile device of claim 1, wherein the spacer is a silicon rubber.

10. The mobile device of claim 1, wherein the bottom holder comprises at least one projection configured to engage a protrusion that fixedly engages the bottom holder.

11. A navigation tool holder for a mobile device, the mobile device having a navigation tool that receives optical input, the navigation tool including a top portion, a bottom portion, and a flexible circuit, the flexible circuit having a first end proximate to the top portion and a second end that extends in a lateral direction away from the top portion, the navigation tool holder comprising:
   a bottom holder including a lower clamp portion and a switch adapted for engagement by the navigation tool; and
   a top holder configured to matingly engage the bottom holder to secure the navigation tool in x-,y-, and z-directions, the top holder including an upper clamp portion that matingly engages the lower clamp portion to define a slot that receives the flexible circuit therebetween, such that the flexible circuit is frictionally engaged at the slot by the upper clamp portion and the lower clamp portion,
   the flexible circuit extending outside the navigational tool holder at a location of engagement by the upper clamp portion and the lower clamp portion, the location of engagement defining a bending point for the flexible circuit when the navigation tool is vertically displaced within the navigation tool holder to engage the switch with the bottom portion, the top holder further including an aperture positioned to receive the top portion of the navigation tool therethrough; and
   a spacer provided at the aperture, the spacer being configured to constrain the vertically displaced navigation tool.

12. The navigation tool holder of claim 11, wherein the navigation tool is one of an optical navigation tool, an optical trackpad, an optical omnidirectional joystick, and an optical jogball.

13. The navigation tool holder of claim 11, wherein the lower clamp portion and the upper clamp portion are configured to engage the flexible circuit.

14. A mobile device comprising:
   a navigation tool that receives optical input, the navigation tool having a top portion, a bottom portion, and a flexible circuit, the flexible circuit having a first end proximate to the top portion and a second end that extends in a lateral direction away from the top portion;
   a navigation tool holder comprising:
      a bottom holder including a lower clamp portion and a switch adapted for engagement by the navigation tool; and
      a top holder configured to matingly engage the bottom holder to secure the navigation tool in x-,y-, and z-directions, the top holder including an upper clamp portion that matingly engages the lower clamp portion to define a slot that receives the flexible circuit therebetween, such that the flexible circuit is frictionally engaged at the slot by the upper clamp portion and the lower clamp portion,
      the flexible circuit extending outside the navigational tool holder at a location of engagement by the upper clamp portion and the lower clamp portion, the location of engagement defining a bending point for the flexible circuit when the navigation tool is vertically displaced within the navigation tool holder to engage the switch with the bottom portion, the to holder further including an aperture positioned to receive the to portion of the navigation tool therethrough.

15. The mobile device of claim 14, wherein the navigation tool is one of an optical trackball, an optical trackpad, an optical omnidirectional joystick, and an optical jogball.

16. The mobile device of claim 14, wherein the first end of the flexible circuit is interposed between the lower clamp portion and the upper clamp portion and the second end of the flexible circuit is opposite to the first end and extends away from the navigation tool holder.

17. The mobile device of claim 16, wherein the upper clamp portion comprises a dimple that extends from the upper clamp portion to engage the first end of the flexible circuit.

18. The mobile device of claim 14, further comprising:
   a spacer provided at the aperture, the spacer being configured to constrain the vertically displaced navigation tool, the spacer being co-molded to the top holder.

* * * * *